(No Model.)

G. HAAG.
LOADING ATTACHMENT FOR DUMP CARTS.

No. 435,825. Patented Sept. 2, 1890.

WITNESSES:
Paul Johst
C. Sedgwick

INVENTOR:
G. Haag
BY
Munn & Co.
ATTORNEYS

UNITED STATES PATENT OFFICE.

GUSTAVE HAAG, OF FLUSHING, NEW YORK.

LOADING ATTACHMENT FOR DUMP-CARTS.

SPECIFICATION forming part of Letters Patent No. 435,825, dated September 2, 1890.

Application filed April 8, 1890. Serial No. 347,015. (No model.)

*To all whom it may concern:*

Be it known that I, GUSTAVE HAAG, of Flushing, in the county of Queens and State of New York, have invented a new and useful Loading Attachment for Dump-Carts, of which the following is a full, clear, and exact description.

My invention relates to a loading attachment for dump-carts, and has for its object to provide a simple and conveniently-manipulated device capable of attachment to any cart, the device being adapted especially for loading street-sweepings from the gutter directly into the cart-body.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
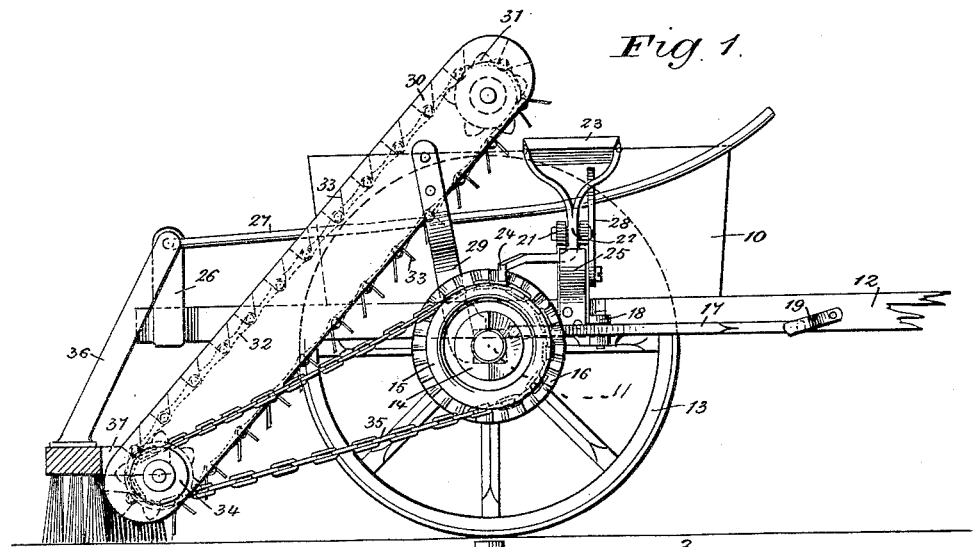
Figure 2:
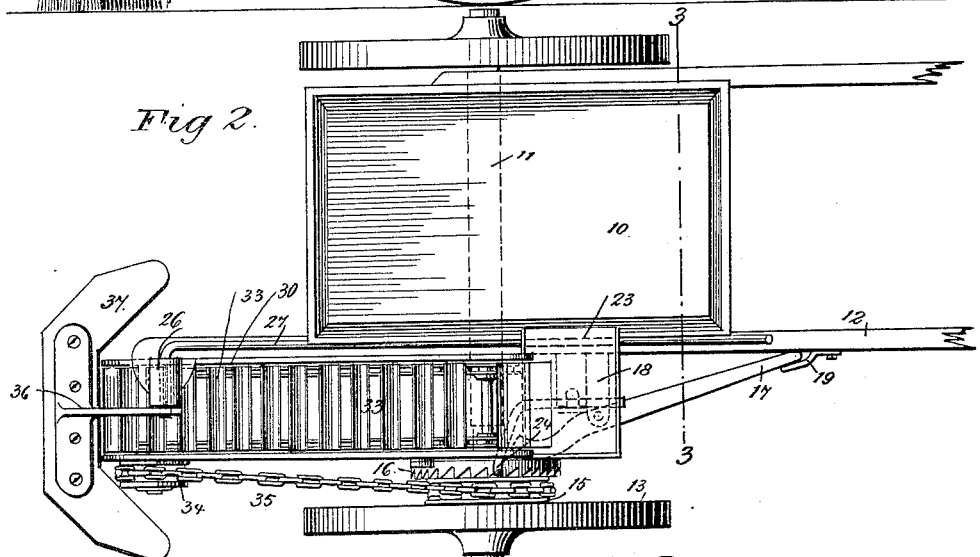
Figure 3:
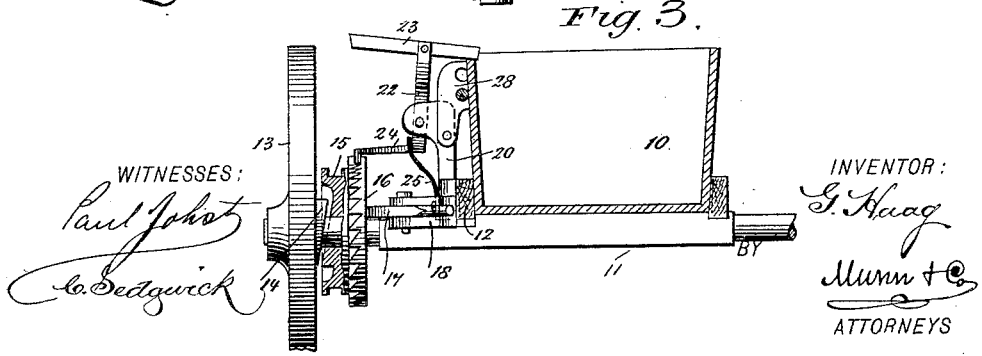

Figure 1 is a side elevation of the device applied to a cart, one wheel of the cart being removed. Fig. 2 is a plan view of the cart and the device applied thereto; and Fig. 3 is a transverse section taken on line 3 3 of Fig. 2, parts being removed.

The cart-body 10 is mounted upon the axle 11 to dump in any suitable or approved manner. The axle of the cart upon the right-hand side, however, is projected a considerable distance beyond the body, and the right-hand shaft 12 is carried some distance to the rear of the body. The right-hand wheel 13 is provided upon its inner face with a clutch-section 14, which is adapted to engage with a clutch-surface formed upon the outer face of a chain-wheel 15, which is loosely mounted upon the right-hand spindle of the axle. The right-hand drive-wheel 13 is also loosely mounted upon the axle. The chain-wheel 15 at its inner face is provided with an upwardly-extending flange 16, and in the outer face of said flange, above the surface of the chain-wheel, a series of ratchet-teeth is produced in the said flange. The chain-wheel 15 is thrown into engagement with the clutch-surface of the drive-wheel 13 by manipulating a lever 17, fulcrumed in a bracket 18, projected from the shaft 12 forward of the axle, the rear end of the said lever 17 being adapted for contact with the inner face of the chain-wheel 15. When the handle or forward end of the lever 17 is pressed inward to a contact with the shaft 12, the rear end of the said lever forces the chain-wheel 15 in contact with the drive-wheel, and the two wheels are held in close engagement by a latch 19, attached to the shaft, being slid over the handle end of the lever, as illustrated in Figs. 1 and 2.

Between the axle and the bracket 18 a perpendicular standard 20 is rigidly secured at its lower end to the shaft 12, the upper end of which standard is provided with an outwardly-extending arm, and in the said arm a slot 21 is produced. In the slot 21 of the said standard a supporting-arm 22 is pivoted, whereby the said arm is capable of being rocked to and from the side of the cart-body. That portion of the arm above the standard is bifurcated, and the members of the bifurcated end are attached to a chute 23, which chute is sustained at a sufficient height by the arm to be laterally rocked over the upper edge of the cart-body when the arm 22 is given an intermittent lateral movement. This intermittent lateral movement is accomplished by forming an angular extension 24 upon the lower end of the arm, having formed at its extremity a finger, which finger is adapted to remain in contact with the teeth of the flange 16 of the chain-wheel at all times. A spring 25 is secured at its lower end to the base of the standard 20, and the upper end of said spring is made to bear against the lower end of the arm 22 at its connection with the angular extension 24.

Upon the rear extremity of the shaft 12 an upright 26 is formed, and transversely in the said upright the angle-arm of a lever 27 is journaled, which lever 27 extends to the front parallel with the right-hand side of the cart-body and is adapted for engagement with a rack 28, attached to the forward side of the standard 20. A bracket 29 is projected upward and slightly rearward from the right-hand end of the axle, between the cart-body and the chain-wheel 15, which bracket is attached at its upper end to the casing of an elevator 30. The elevator 30 extends diagonally upward at the rear portion of the right-hand side of the cart, and is further supported by being attached to the shaft 12 where it crosses the same by a suitable bracket. (Not shown in the drawings.)

The elevator consists, preferably, of two side pieces, in the top and bottom of which a suitable shaft is journaled, each shaft having secured thereto two chain-wheels 31. Over these chain-wheels endless-chain belts 32 are passed, and upon the said chain belts a series of preferably V or U shaped pockets 33 is secured. The lower chain-wheel shaft is provided at one outer end with a sprocket-wheel or chain-wheel 34, which is connected by a chain belt 35 with the chain-wheel 15 upon the axle 11. The elevator extends from a point near the ground quite a distance upward beyond the cart-body, and immediately to the rear of the upper portion of the elevator the rocking chute 23 is located.

Upon the end of the angle-arm of the lever 27 the upper extremity of a bar 36 is rigidly secured, which bar extends downwardly and rearwardly and is firmly attached at its lower end to the head of a practically V or U shaped brush 37. This brush essentially surrounds the lower portion of the elevator, and may be made to contact with the ground by raising the lever 27 while it is elevated therefrom by depressing the said lever.

In operation, when the cart is driven in the gutter or other point in the street—for instance, where a pile of dirt has been accumulated—the lever 27 is elevated and the brush 37 brought in contact with the surface of the ground. Prior to elevating the lever 27 the lever 17 is pressed inward and secured by the latch 19, whereupon the chain-wheel 15 is brought into engagement with the right-hand drive-wheel 13. A rotary movement is thus imparted to the chain-wheel, and as the chain-wheel revolves the chain belts of the elevator are set in operation, and the angular extension 24 of the arm 22, carrying the chute 23, contacting with the teeth upon the flange 16 of the said chain-wheel 15, imparts to the chute and arm 22 an intermittent, lateral, vibratory movement, whereby as the dirt swept by the brush to the elevator is delivered by said elevator into the chute it is shaken by the latter into the body of the cart. When a suitable load has been obtained, the lever 27 is depressed and the brush elevated and the lever 17 is released, whereupon the spring 25, acting upon the arm 22, sustaining the chute 23, forces the lower end extension of said arm inward, thereby disengaging the chain-wheel 15 from the drive-wheel 13, and the upper end of the arm 22 is at the same time thrown outward, thus carrying the chute 23 beyond the sides of the cart and permitting the said cart to be dumped as though no attachment were applied.

Having thus described my invention, I claim as new and desire to secure by Letters Patent—

1. The combination, with a vehicle, of an elevator having an endless series of buckets delivering into the same and scooping or lifting the dirt directly from the surface of the ground and a stationary transverse U-shaped or curved brush adjacent to and inclosing the rear side of the lower end of the elevator, substantially as set forth.

2. The combination, with a dumping-cart, of an elevator located at one side of the same and having an endless series of buckets passing close to the surface of the ground to scoop the dirt directly therefrom, a stationary transverse vibratory chute receiving the dirt from the elevator and discharging it into the cart, and a vertically-adjustable brush extending transversely across the rear side of the lower end of the elevator to scrape or sweep the dirt into a pile on the ground in the path of the elevator-buckets, substantially as set forth.

3. The combination, with a cart-body, the axle, and the drive-wheels, of an elevator-frame containing a series of buckets supported at one side of the cart-body, an essentially U-shaped brush located at the rear of the lower end of the elevator, a vibratory chute located in front of the elevator near the top and capable of extending over the body of the cart, and means, substantially as shown and described, for imparting to the chute a vibratory movement and a rotary movement to the elevator-buckets from the drive-wheels of the cart, as and for the purpose specified.

4. The combination, with a cart-body, its axle and drive-wheels, one of said drive-wheels being provided with a clutch upon its inner face, and a chain-wheel loosely mounted upon the axle, also provided with a clutch-face adapted for engagement with the clutch of the drive-wheel, and an inner toothed peripheral flange, of an elevator located at one side of the body of the cart, the buckets of which are driven from the chain-wheel and the axle, a vertically-adjustable brush located at the rear of and practically surrounding the bottom of the elevator, a spring-pressed arm pivoted at the front of the elevator, a chute attached to the upper end of said arm, an angular extension formed integral with the lower end of the arm and contacting with the toothed flange of the axle chain-wheel, and means, substantially as shown and described, for throwing the chain-wheel into gear with the opposed drive-wheel and for elevating and lowering the said brush, as and for the purpose specified.

GUSTAVE HAAG.

Witnesses:
W. FRANK WHITE,
OTTO AMANN.